US012717281B2

(12) United States Patent
Saito et al.

(10) Patent No.: US 12,717,281 B2
(45) Date of Patent: Aug. 25, 2026

(54) ELECTRONIC DEVICE INCLUDING SOLAR BATTERY AND TIMEPIECE INCLUDING SOLAR BATTERY

(71) Applicant: CASIO COMPUTER CO., LTD., Tokyo (JP)

(72) Inventors: Yuta Saito, Tachikawa (JP); Sae Uchibayashi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 504 days.

(21) Appl. No.: 17/949,697

(22) Filed: Sep. 21, 2022

(65) Prior Publication Data

US 2023/0089924 A1 Mar. 23, 2023

(30) Foreign Application Priority Data

Sep. 21, 2021 (JP) ................................ 2021-152858

(51) Int. Cl.
*G04C 17/00* (2006.01)
*G04C 10/02* (2006.01)

(52) U.S. Cl.
CPC ......... *G04C 17/0058* (2013.01); *G04C 10/02* (2013.01)

(58) Field of Classification Search
None
See application file for complete search history.

(56) References Cited

U.S. PATENT DOCUMENTS

| | | | | |
|---|---|---|---|---|
| 6,229,767 B1 * | 5/2001 | Miyazawa ........ G02F 1/133555 368/242 |
| 2012/0252373 A1 | 10/2012 | Saito et al. |
| 2019/0294120 A1 | 9/2019 | Nakajima |

FOREIGN PATENT DOCUMENTS

| | | |
|---|---|---|
| JP | 51159169 | 12/1976 |
| JP | S52112350 A | 9/1977 |
| JP | 1-148889 A | 10/1989 |
| JP | 2002350567 A | 12/2002 |
| JP | 2003139872 A | 5/2003 |
| WO | 2019175687 A1 | 9/2019 |

OTHER PUBLICATIONS

Extended European Search Report dated Jan. 19, 2023 received in European Patent Application No. EP 22194275.8.
Chinese Office Action dated Feb. 4, 2026 received in Chinese Application No. 202211149965.8.

* cited by examiner

*Primary Examiner* — Renee S Luebke
*Assistant Examiner* — Matthew Daniel Hwang
(74) *Attorney, Agent, or Firm* — Scully, Scott, Murphy & Presser, P.C.

(57) ABSTRACT

An electronic device includes: a date indicator that includes a letter part and a non-letter part different from the letter part, the non-letter part being a through hole; and a solar battery disposed below the date indicator.

16 Claims, 11 Drawing Sheets

ELECTRONIC DEVICE INCLUDING SOLAR BATTERY AND TIMEPIECE INCLUDING SOLAR BATTERY

BACKGROUND OF THE INVENTION

Field of the Invention

The present disclosure relates to an electronic device and a timepiece.

Description of the Related Art

There is widely known an electronic device (e.g., a timepiece) including a solar panel that uses light to generate electricity. The solar panel generates electricity and charges a secondary battery, so that the timepiece is able to be used without replacement of batteries.

It is preferable that the solar panel be disposed at a visible side of the timepiece so that the solar panel certainly receives light and so that other components do not block light. A solar panel may be provided on the entire surface of the visible side of a timepiece to generate a greater amount of electric power.

However, unlike a dial as an example, a solar panel may not have an elaborated design on its surface. When a solar panel is disposed topmost and directly visible from outside, the external appearance of the timepiece may be deteriorated.

There is also a demand by users who love timepieces that the internal structure of a timepiece be visible. In particular, an analog timepiece that indicates time with hands includes therein a wheel mechanism that consists of gear wheels and so forth for rotating the hands. A timepiece that visibly exposes such a wheel mechanism as the external appearance will look excellent. However, main components of a wheel mechanism (e.g., gear wheels) are arranged around the central part of a timepiece. To make these components visible from outside, the timepiece needs to have a space in its central part that is not covered on its visible side.

For example, JP2002-350567A proposes disposing a ring-shaped solar panel at around the outer circumference of a timepiece and forming components that are disposed at the visible side of the solar panel with a material having a high level of optical transparency (e.g., transparent acrylic plate).

SUMMARY OF THE INVENTION

According to an aspect of the present disclosure, there is provided an electronic device including: a date indicator that includes a letter part and a non-letter part different from the letter part, the non-letter part being a through hole; and a solar battery disposed below the date indicator.

Further features of the present invention will become apparent from the following description of exemplary embodiments (with reference to the attached drawings).

DESCRIPTION OF THE EMBODIMENTS

Hereinafter, an embodiment of a timepiece as an electronic device according to the present invention is described with reference to FIG. 1 to FIG. 9.

The embodiment described below is provided with various limitations technically preferable for carrying out the present invention. However, the scope of the present invention is not limited to the embodiment below or illustrated examples.

A member such as a transparent acrylic plate, which is disclosed in the above-mentioned JP2002-350567A, absorbs light to some extent. When such a member covers the solar panel, the light reception efficiency of the solar panel decreases by the covered portion and the solar panel may fail to generate a sufficient amount of electric power.

The present disclosure allows an electronic device/timepiece to generate a sufficient amount of electric power with the solar panel and increases the flexibility in designing the electronic device/timepiece to provide a well-designed luxurious electronic device/timepiece.

Figure 1:
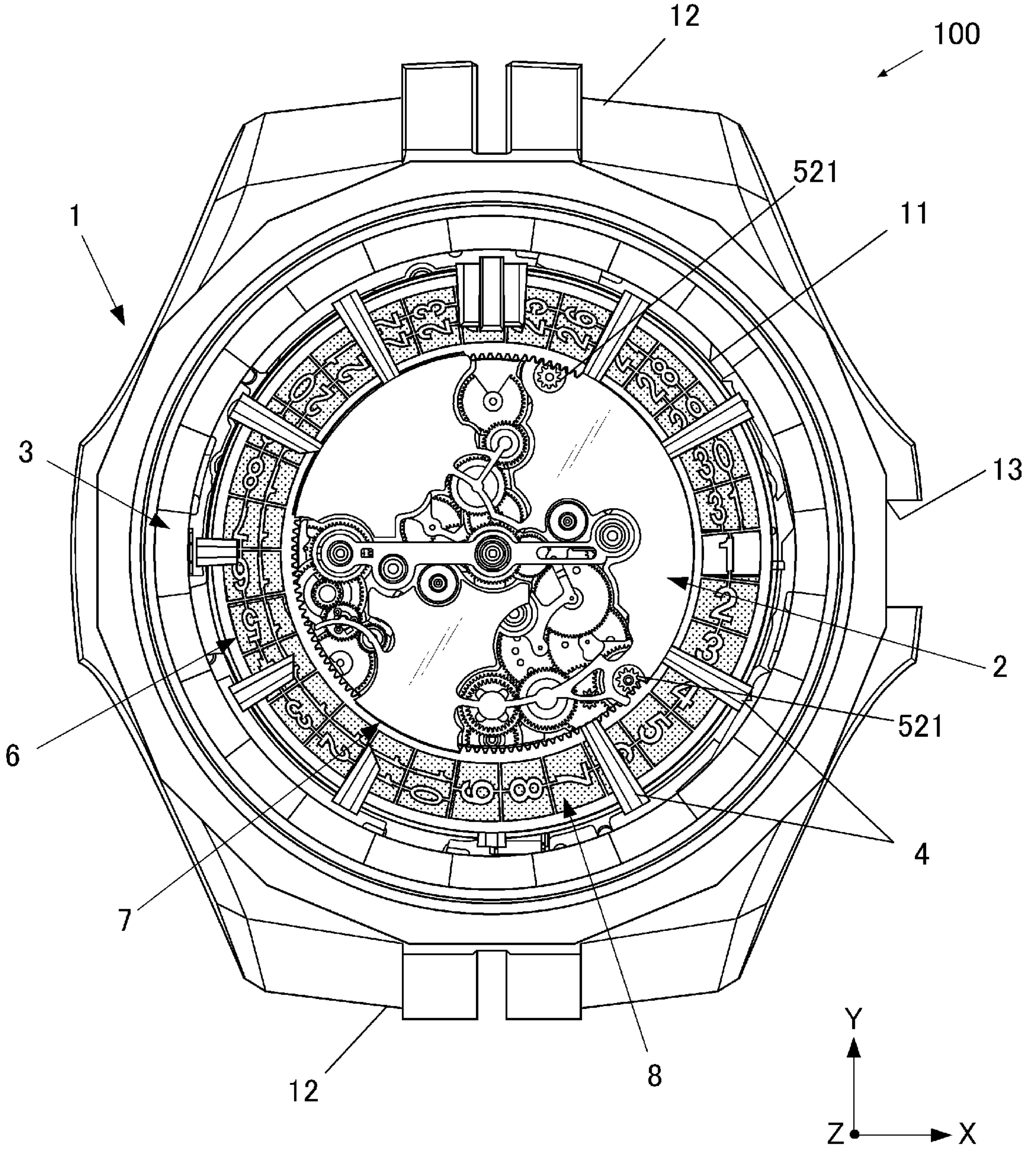
FIG. 1 is a front view of a timepiece in an embodiment.
Figure 2:
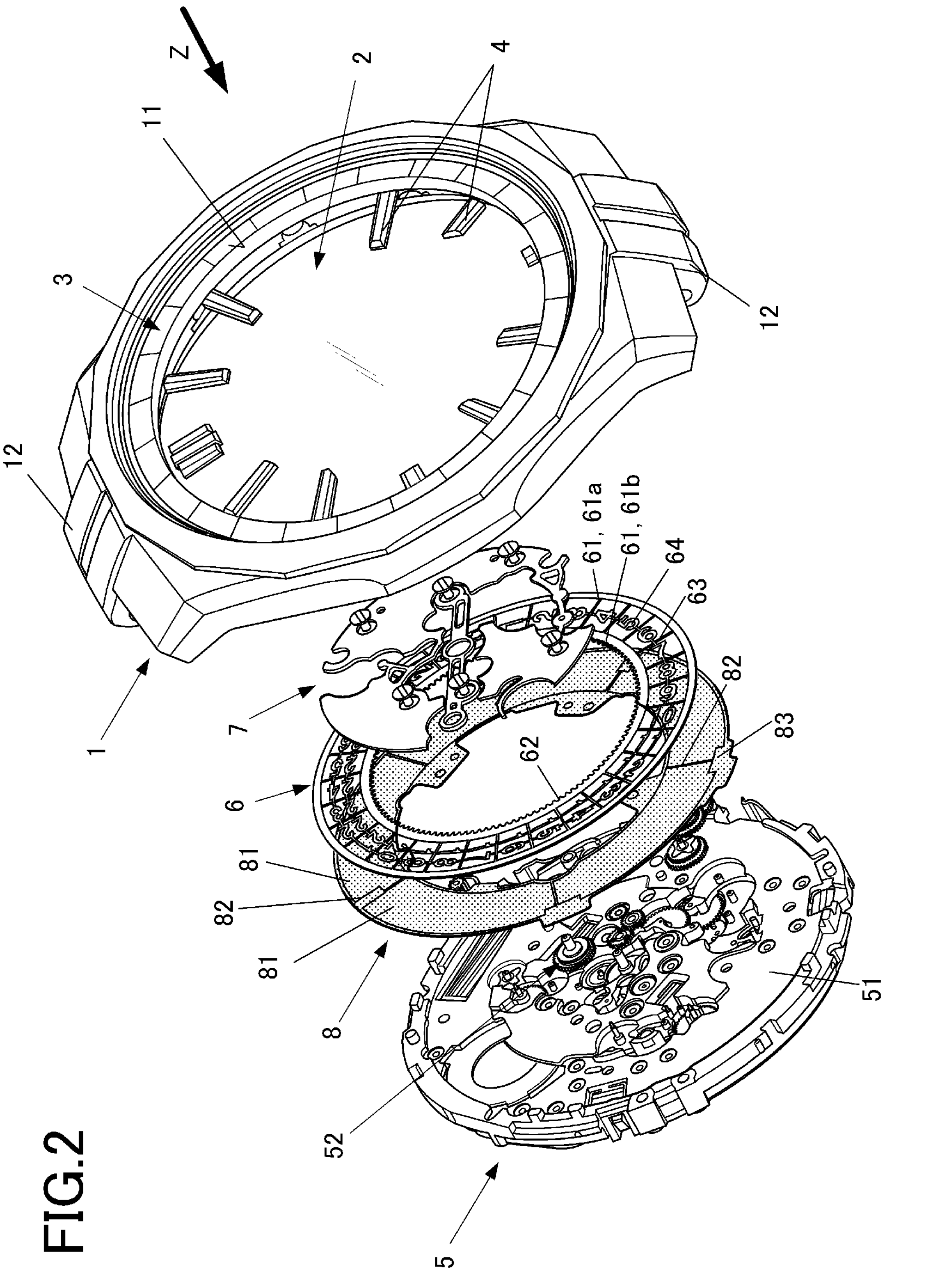
FIG. 2 is an exploded perspective view of main components of the timepiece in the embodiment.

FIG. 1 is a front view of a timepiece in this embodiment. FIG. 2 is an exploded perspective view of main components of the timepiece in FIG. 1. In FIG. 1 and other figures, hands (minute hand, etc.) are not depicted.

In the following embodiment, the X direction corresponds to the direction of 9 o'clock and 3 o'clock, the Y direction corresponds to the direction of 12 o'clock and 6 o'clock, and the Z direction corresponds to the viewing direction from the visible side toward the invisible side. Hereinafter, the visible side may be referred to as "top side", and the invisible side as "bottom side". The X, Y directions and the Z direction (viewing direction) are shown in FIG. 1.

The timepiece 100 in this embodiment includes a case (hereinafter called timepiece case 1 in this embodiment), as shown in FIG. 1. The timepiece case 1 is made of metal (e.g., stainless, titanium), ceramic, or synthetic resin, for example. The material of the timepiece case 1 is not limited to these examples.

The timepiece case 1 in this embodiment has the shape of a hollow short column. To the opening 11 of the timepiece 1 at the front surface side (the visible side of the timepiece 100, the side seen in the viewing direction Z in FIG. 1 and FIG. 2), a windshield member 2 made of transparent glass, for example is attached. The back surface side of the timepiece 100 is covered by a not-illustrated back lid.

The timepiece case 1 has band attachment parts 12 at the ends of the timepiece case 1 in the top-bottom direction in FIG. 1 (the ends in the Y direction), namely at the ends corresponding to the 12 o'clock side and the 6 o'clock side of the analog timepiece. The band attachment parts 12 are for attaching a not-illustrated timepiece band.

The timepiece 100 has a not-illustrated operation receiver(s) (e.g., a crown, a push button), and the timepiece case 1 has a cut part 13 at a position corresponding to the operation receiver (e.g., on the lateral side of the timepiece case 1).

Below the windshield member 2 (at the invisible side/back surface side of the windshield member 2), a ring-shaped parting member 3 is disposed. The parting member 3 extends along the opening 11 of the timepiece case 1. At the internal circumferential side of the parting member 3, hour signs 4 are arranged at a predetermined interval. The hour signs 4 are pointed by not-illustrated hands (e.g., hour hand, minute hand) to indicate the time. The hour signs 4 are made of metal, such as stainless or titanium, for example. The material and the position of the hour signs 4 are not limited to these examples.

The timepiece case 1 houses a module 5 and so forth. The module 5 includes a main plate 51, a not-illustrated motor, a not-illustrated antenna, a wheel mechanism 52, and a board 57 (see FIG. 9A) that are appropriately dispersed on the front and the back of the main plate 51 (on the visible and invisible sides of the main plate 51 with respect to the timepiece). In FIG. 2, the thick arrow indicates the viewing direction Z from the visible side toward the invisible side. The board 57 is mounted with not-illustrated circuits, terminals, and so forth.

In the timepiece 100 in this embodiment, a time indicator includes the hour signs 4, the hands for pointing the hour signs 4 (e.g., not-illustrated hour hand and minute hand), and the module 5 including the motor and the wheel mechanism 52 for moving the hands. The time indicator of the timepiece 100 indicates the time in the analog method by pointing appropriate hour signs 4 with the hands moved via the wheel mechanism 52.

The date indicator 6 is disposed above the module 5 (at the visible side of the timepiece). The date indicator 6 is rotated via the wheel mechanism 52. On the date indicator 6, the date indicator holder 7 is disposed.

In this embodiment, a solar battery is disposed at the invisible side of the date indicator 6 (i.e., below the date indicator 6). The solar battery is disposed between the date indicator 6 and the module 5. The solar battery in this embodiment is a ring-shaped solar panel 8.

The timepiece 100 in this embodiment does not include a dial plate, for example. By omitting a dial plate, the timepiece 100 can be made thin with less plate members layered, namely less parts. Further, by omitting a dial plate, the timepiece 1 can avoid a decrease in generation efficiency, which may be caused by the material of the dial plate that absorbs light. Accordingly, the timepiece 1 can generate a sufficient amount of electric power with a smaller area of the effective electricity generation region (described later).

Figure 3:
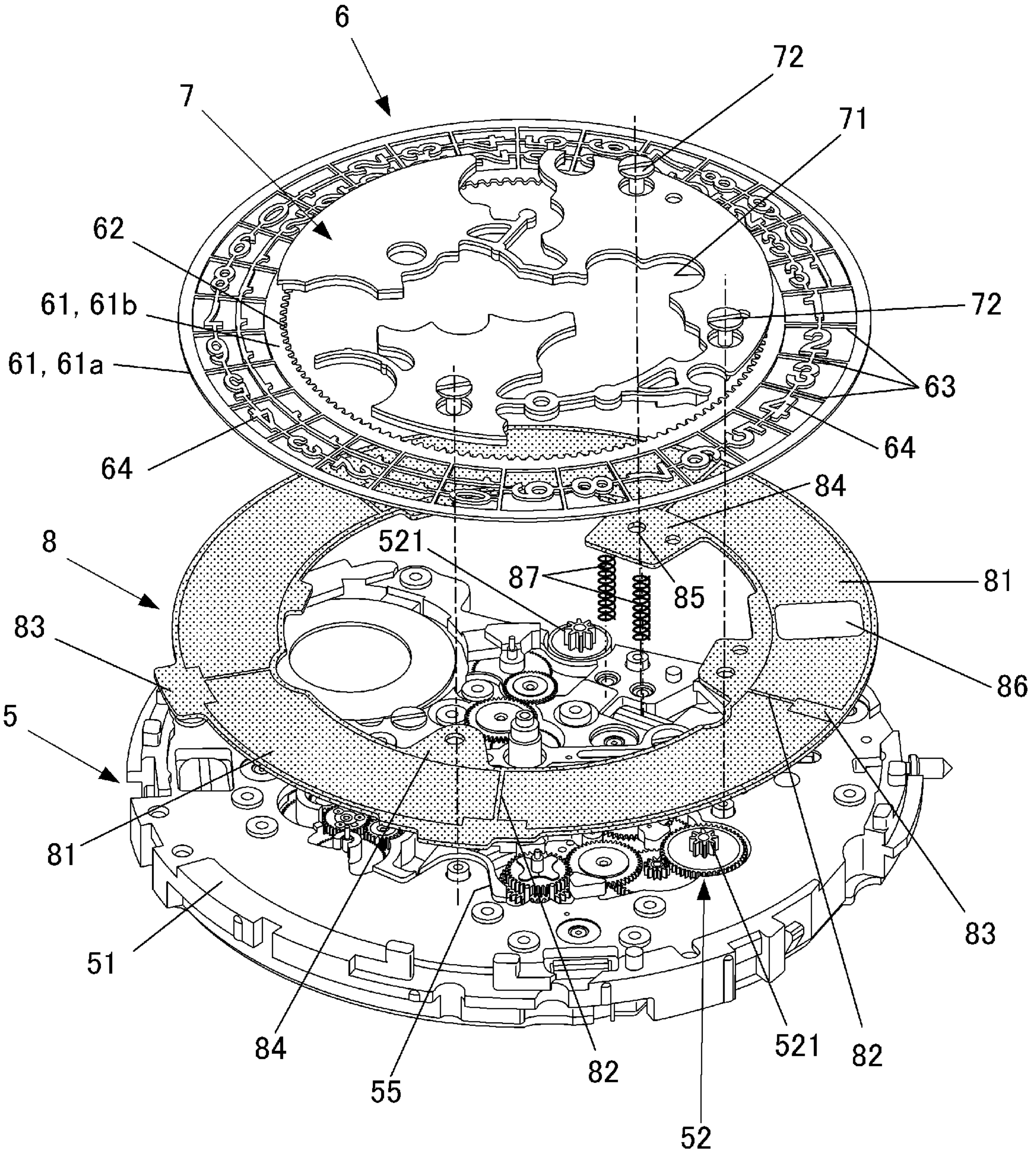
FIG. 3 is an exploded perspective view of main components of the timepiece in the embodiment.

FIG. 3 shows an exploded perspective view that shows details of the module 5, the date indicator 6, the date indicator holder 7, and the solar panel 8.

As shown in FIG. 3, the date indicator 6 includes a frame 61 and letter parts 64. The frame 61 has a gear 62 that is formed along the circumference of the frame 61 and that engages with the gear wheel (gear wheel 521 in FIG. 1 to be described later) constituting the wheel mechanism 52. The letter parts 64 are supported by the frame 61 via bridges 63.

The date indicator 6 is made of metal, such as stainless or titanium. The non-letter parts of the date indicator 6, which are different from the letter parts 64, are through holes that pass through the date indicator 6. Specifically, the non-letter parts are through holes that pass through the front and the back of the date indicator 6. The non-letter parts are parts except (i) the letter parts 64 and (ii) parts necessary for supporting the letter parts 64 and for maintaining the shape of the date indicator 6, such as the frame 61 and the bridge 63.

The date indicator 6 is thus formed by making through holes on metal material (by lightening metal material). Such a date indicator 6 looks substantial and solid as compared with a date indicator made of transparent material on which letter parts are printed, and is able to give an air of luxuriousness to the external appearance of the timepiece.

The method of forming the date indicator 6 by making through holes on part of metal material except the frame 61, the bridge 63 and the letter part 64 is not limited to a specific method.

To make the through holes, various methods are applicable: micromachining technology applied to micro electro mechanical systems (MEMS), etching, and laser processing, for example. The date indicator 6 may also be formed by punching out holes on a metal plate or by casting, for example.

The date indicator 6 in this embodiment includes, as the frame 61, the first frame part 61*a* and the second frame part 61*b*. The second frame part 61*b* is disposed inside the first frame part 61*a*.

In this embodiment, the gear 62 is formed along the inner circumferential surface of the second frame part 61*b*. Inside the second frame part 61*b* (at the side closer to the rotation center), the gear 62 engages with the wheel that constitutes the wheel mechanism 52.

The letter parts 64 of the date indicator 6 are parts that visually express the numbers from 1 to 31 as days in one month. Between one letter part 64 and the neighboring letter part 64, a bridge 63 (first bridge part 63*a*) is formed so as to partition one date from another. The bridge 63 (first bridge part 63*a*) is formed across the first frame part 61*a* and the second frame part 61*b*.

Figure 4:
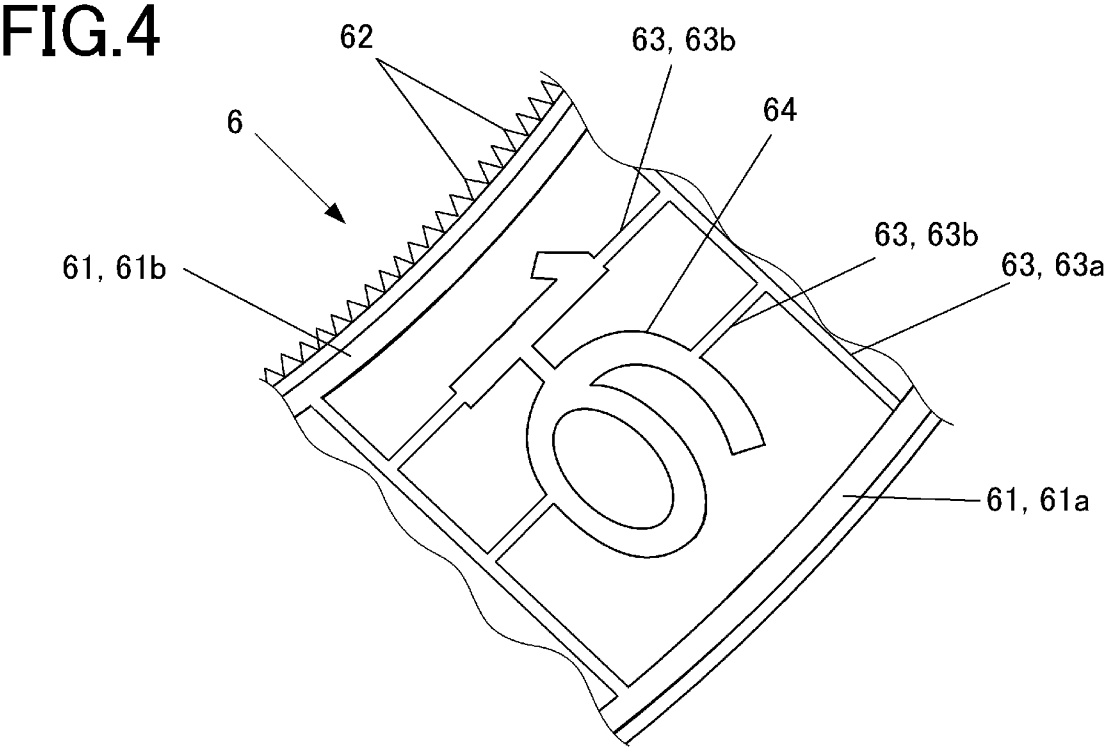
FIG. 4 is a plan view in which part of a date indicator in the embodiment is enlarged.

FIG. 4 is an enlarged view in which part of the date indicator 6 in this embodiment (the letter part 64 corresponding to "16" and its surroundings) is enlarged.

As shown in FIG. 4 and so forth, each of the letter parts 64 in this embodiment is connected to the bridges 63 (second bridge parts 63*b*) that cross the other bridges 63 (first bridge parts 63*a*) and that extend along the circumferential direction of the frame 61. Each of the letter parts 64 is supported by the frame 61 via the first bridge parts 63*a* and the second bridge parts 63*b* (i.e., the letter part 64 is supported between the first frame part 61*a* and the second frame part 61*b*).

The structure of the date indicator 6 is not limited to the one shown in FIG. 4.

Figure 5:
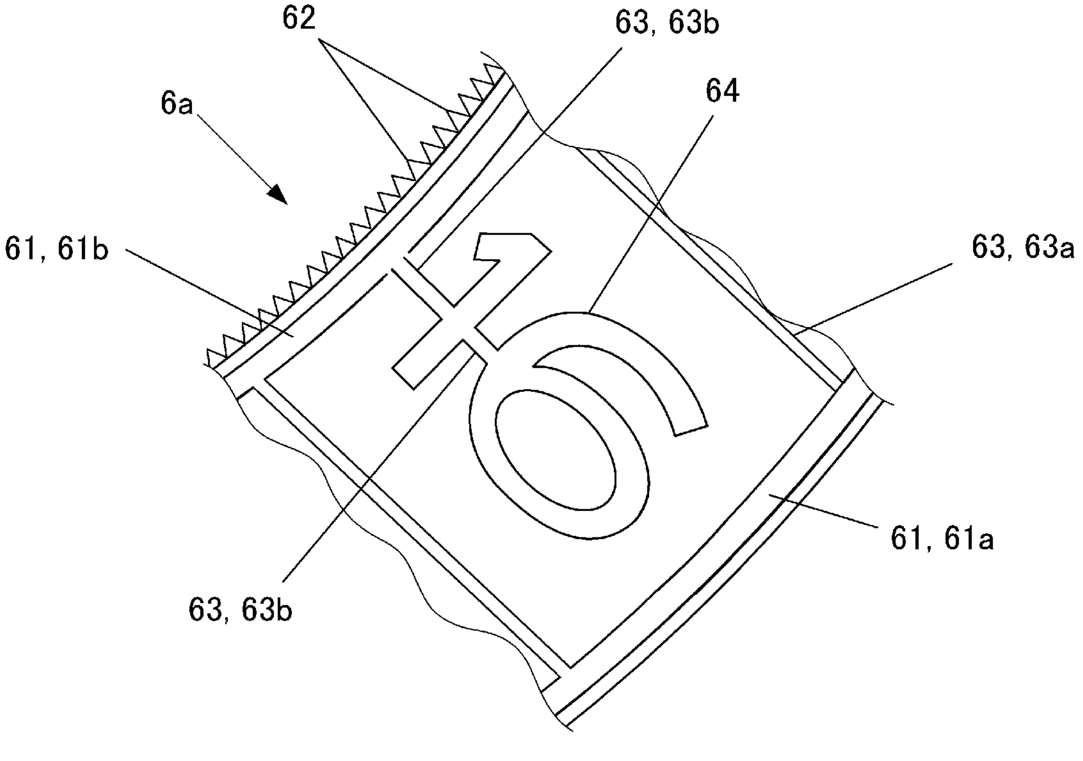
FIG. 5 is a plan view in which part of a date indicator in a modification is enlarged.

For example, the letter part 64 may be supported like a cantilever by the first frame part 61*a* or the second frame part 61*b* via the bridge 63, as shown in FIG. 5. In the case, there may be only one frame 61 at the outside or inside of the letter part 64. For example, in FIG. 5, the frame 61 may consist of only the second frame part 61*b*, which is inside the letter part 64, and may not include the first frame part 61*a* outside the letter part 64.

Conversely, the letter part 64 may be supported like a cantilever by the first frame part 61*a* provided outside the letter part 64, and the second frame part 61*b* may be omitted. In such a case, the gear 62 is formed along the outer circumferential surface of the first frame part 61*a*, and the gear 62 at the outside of the date indicator 6 engages with the gear wheel that constitutes the wheel mechanism 52 (the gear wheel 521 shown in FIG. 1, FIG. 3, FIG. 7 and FIG. 8).

The first bridge part 63*a*, which partitions one letter part 64 from another, is not essential. For example, when the letter part 64 is directly connected to the frame 61 via the bridge 63 (the second bridge part 63*b*) that extends in the radial direction of the date indicator 6 as shown in FIG. 5, the first bridge part 63*a* may be omitted.

As described below, in this embodiment, the solar panel 8 is disposed below the date indicator 6 (at the invisible side of the date indicator 6, below the date indicator 6 in the viewing direction Z). The date indicator 6 made of metal does not transmit light. When the frame 61, the bridge 63, and the letter parts 64 overlap with the solar panel 8, the power generation efficiency decreases. It is therefore preferable that the date indicator 6 have as many (large) through holes as possible in order to minimize (narrow) the part constituting the frame 61 and the bridge 63 to the extent that the strength (shock resistance) of the date indicator 6 is retained. Regarding the letter parts 64, the through holes are formed so as not to sacrifice the viewability of the letter parts 64.

Figure 6:
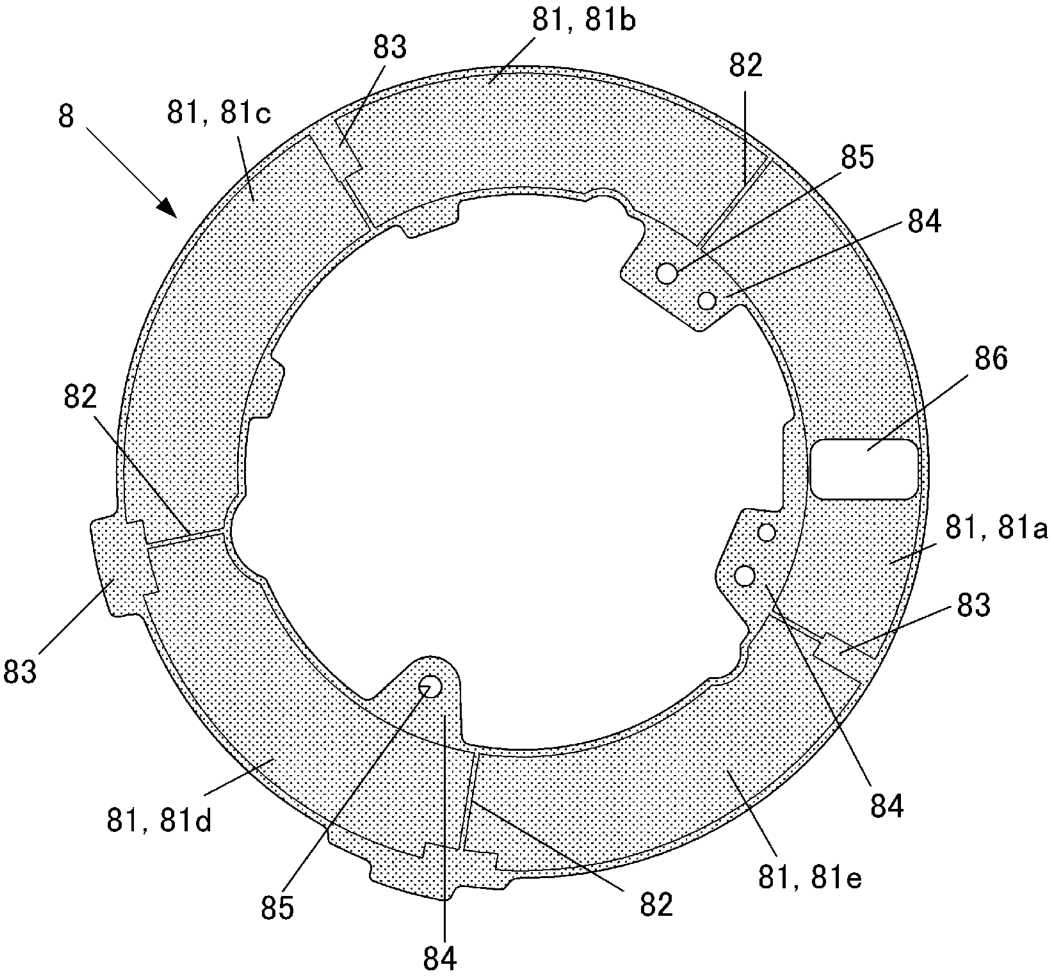
FIG. 6 is a plan view of a solar panel in the embodiment.

FIG. 6 is a front view of a configuration example of the solar panel in this embodiment.

The solar panel 8 is a solar battery that generates electricity using the received light. The electricity generated by the solar panel 8 through photovoltaic generation is stored in a not-illustrated secondary battery.

As shown in FIG. 6, a ring-shaped panel (main body) of the solar panel 8 is divided into multiple cells 81. The number of cells 81 into which the solar panel 8 is divided is not specifically limited. In this embodiment, the solar panel 8 is divided into five cells 81 (cell 81*a* to cell 81*e*).

The voltage generated by the solar panel 8 is stored in the not-illustrated secondary battery as a power source for the components constituting the timepiece 100. However, a single cell (solar cell) generates a low voltage. To stably charge the secondary battery, in this embodiment, the solar panel 8 is divided into multiple cells 81, and the cells 81 are connected in series, so that the solar panel can generate a higher voltage.

The greater the number of cells 81 connected in series is, the higher the voltage generated by the entire solar panel 8 is. It is preferable that the number of cells 81 constituting the solar panel 8 be determined according to the required voltage level (e.g., the voltage of the secondary battery that stores electricity generated by the solar panel 8).

The solar panel 8 includes division lines 82 that divide the solar panel 8 into the cells 81 (cells 81*a* to 81*e*). In this embodiment, the division lines 82 extend in the radial direction of the ring-shaped solar panel 8 so that the cells 81 are substantially fan-shaped.

The parts corresponding to the division lines 82 are not used for generation of electricity. It is therefore preferable that the components disposed at the visible side of the solar panel 8 overlap with the division lines 82 to the extent possible. Accordingly, less areas are covered in the visible-side area of the effective electricity generation region, which is the region effectively used for electricity generation. This can restrain a decrease in generation efficiency.

In this embodiment, when the date indicator 6 is stationary, at least one of the bridges 63 of the date indicator 6 (the first bridge parts 63*a* along the radial direction of the date indicator 6) overlaps with at least one of the division lines 82 of the solar panel 8. More preferably, when the date indicator 6 is stationary, each of the division lines 82 of the solar panel 8 always overlaps with any of the bridges 63 of the date indicator 6.

The shape of the division lines 82 corresponds to the shape of the bridges 63 (e.g., the first bridges 63*a*). Thus, when the bridges 63 are positioned so as to correspond with the division lines 82, the division lines 82 are hidden by the bridges 63. This allows the timepiece 1 to look better. Since the effective electricity generation region is not covered by the bridges 63, the timepiece 100 can restrain a decrease in electricity generation.

The solar panel 8 further incudes cell connectors 83 that connect the cells 81. Each of the cell connectors 83 is disposed across the consecutive cells 81. As described above, in this embodiment, the solar panel 8 is constituted of multiple division cells 81 and the cell connectors 83 that connect the cells 81 in series.

In one solar panel 8 that is constituted of multiple cells 81 connected in series, when output current values are different among the cells 81, the output current value of the solar panel 8 is lowered according to the lowest current value among the cells 81.

To increase the generation efficiency, it is preferable that the area of the effective electricity generation region of each cell 81 be as equal as possible.

In this embodiment, the intervals between the division lines are aligned so that the five cells 81*a* to 81*e* have approximately the same area.

When a metal member that may affect electric generation (e.g., relatively large metal hour signs 4 or metal decorations, such as a not-illustrated logo) overlaps with the surface of the solar panel 8, the optical transparency decreases in part of the effective electricity generation region of the cells 81. As a result, the electric power generated by the cells 81 decreases, and the generation efficiency of the whole solar panel 8 decreases.

In such a case, it is preferable that the area of the substantial effective electricity generation region of each cell 81 be nearly equal to one another. For example, when a cell 81 has a low optical transparency in part of its effective electricity generation region, the cell 81 may have a greater area than the other cells 81.

The parts corresponding to the cell connectors 83 are not used for generation of electricity, as with the parts corresponding to the division lines 82. It is therefore preferable that the components disposed at the visible side of the solar panel 8 overlap with the cell connectors 83 to the extent possible.

Specifically, the cell connectors 83 are formed to overlap with the letter parts 64 of the date indicator 6 when the date indicator 6 is stationary, for example. The cell connectors 83 may be disposed under the hour signs 4 (the cell connectors 83 may overlap with the hour signs 4). More preferably, when the date indicator 6 is stationary, each of the cell connectors 83 of the solar panel 8 always overlaps with any of the letter parts 64 of the date indicator 6.

Preferably, the shapes of the cell connectors 83 are as close as possible to the shapes of overlapping members (letter parts 64, hour signs 4).

Accordingly, less areas are covered in the visible side of the effective electricity generation region. This can minimize a decrease in generation efficiency.

The inner circumferential part and the outer edge part of the ring-shaped solar panel 8 are not used for generating electricity (non-light-receiving region). As shown in FIG. 1 and so forth, in this embodiment, the frame 61 of the date indicator 6 (the first frame parts 61*a*, the second frame parts 61*b*) overlaps with the non-light-receiving region when viewed from the visible side.

According to such a configuration, the region of the solar panel 8 that corresponds to the through holes of the date indicator 6 is utilized as the light receiving region of the solar panel 8. Further, the region of the date indicator 6 looks uniform and looks better. Further, the edges of the cells 81 of the solar panel 8 do not interfere with the edges of the through holes of the date indicator 6, and the date indicator 6 can move smoothly. Further, the bridges 63 of the date indicator 6 are prevented from contacting the edges of the cells 81 of the solar panel 8. Thus, the damage to the bridges 63 can be prevented.

The solar panel 8 further includes a date background region 86 at a part corresponding to the date indication position where the date indicator 6 indicates a date. The date background region 86 is colored so as to be highly distinguishable from the date indicator 6.

For example, in FIG. 1, FIG. 3 and so forth, the date background region 86 is part of the solar panel 8 that corresponds to the date and that is colored differently from the other part of the entire solar panel 8. Specifically, in FIG. 1, the date background region 86 is the part corresponding to the letter part "1" and colored white, whereas the other part of the solar panel 8 is shaded.

The date background region 86 is formed by directly coloring part of the surface of the solar panel 8, for example. The coloring may be done by any method, such as printing or various techniques of vapor deposition.

The date background region 86 may also be formed by cutting out part of the solar panel 8 and fitting a plate or a film of a different color from the color of the solar panel 8 into the cut-out part or by attaching the plate/film to the cut-out part from the back surface side. The date background region 86 having a color clearly distinguishable from the date indicator 6 may also be formed by any other method.

The date background region 86 is formed at the position of 3 o'clock of the timepiece, for example. In FIG. 6, the date background region 86 is formed in the effective electricity generation region of the cell 81*a*.

When, for example, the date background region 86 is formed by fitting a plate or a film, the region corresponding to the date background region 86 cannot generate electricity. In consideration of the area of the date background region 86, the area of the cell 81*a* may be a little larger than the areas of the respective other cells 81.

When the date background region 86 is not used for generation of electricity, the cell connector 83 may be provided at the position of the date background region 86. By gathering as many regions not used for generation of electricity as possible at the same position, the effective electricity generation region can be maximized to the extent possible.

Figure 9A:
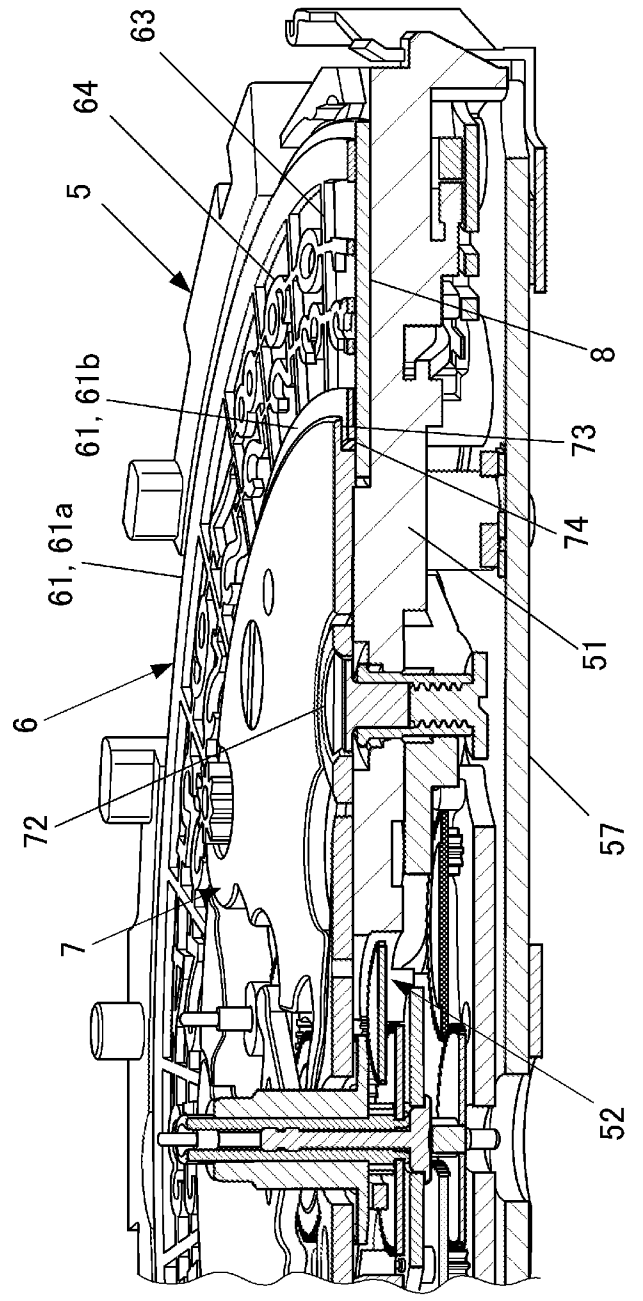
FIG. 9A is a perspective cross section of part of the internal structure of the timepiece in the embodiment.

The solar panel 8 further includes contact parts 84 that are electrically connected to the board 57 (see FIG. 9A). The contact parts 84 may not be used as the effective electricity generation region. Therefore, preferably, the contact parts 84 are arranged inside or outside the ring-shaped main body so as not to affect the area of the effective electricity generation region of the solar panel 8.

In this embodiment, three contact parts 84 are formed at three positions inside the ring-shaped main body of the solar panel 8. As shown in FIG. 3, one of the three contact parts 84 is in contact with the board 57, which is disposed at the invisible side of the module 5, via contact springs 87.

The contact parts 84 may be provided outside the ring-shaped main body of the solar panel 8. In the case, the contact parts 84 are disposed below the parting member 3 and favorably invisible from outside. However, in the assembled state, the contact springs 87 biases the solar panel 8 upward. To avoid the solar panel 8 and the date indicator 6 placed above the solar panel 8 from being pushed upward, a holder member for holding them is required on the contact part 84 (i.e., at around contact points at which the contact springs 87 are in contact with the contact part 84). The holder member may be provided to the parting member 3, for example.

When the contact parts 84 are provided inside the ring-shaped main body of the solar panel 8 as in this embodiment, the date indicator 6 is held down from the above by a date indicator holder, as described later. The date indicator holder can hold the pushing of the contact springs 87 without any additional members.

In this embodiment, the contact parts 84 also function as a rotation preventer that prevents the solar panel 8 from rotating in the circumferential direction.

When the ring-shaped main body of the solar panel 8 has no projections or recesses on its circumferential surface, the solar panel 8 may rotate in the circumferential direction by the rotation of the date indicator 6, the vibration applied to the timepiece 100, or other effects. To prevent the solar panel from rotating, the solar panel 8 may have to be screwed through screw holes at the sacrifice of the effective electricity generation region, for example.

In this embodiment, the contact parts 84 are formed at the inside or outside of the ring-shaped main body. These contact parts 84 can be used for preventing the solar panel 8 from rotating in the circumferential direction.

Figure 7:
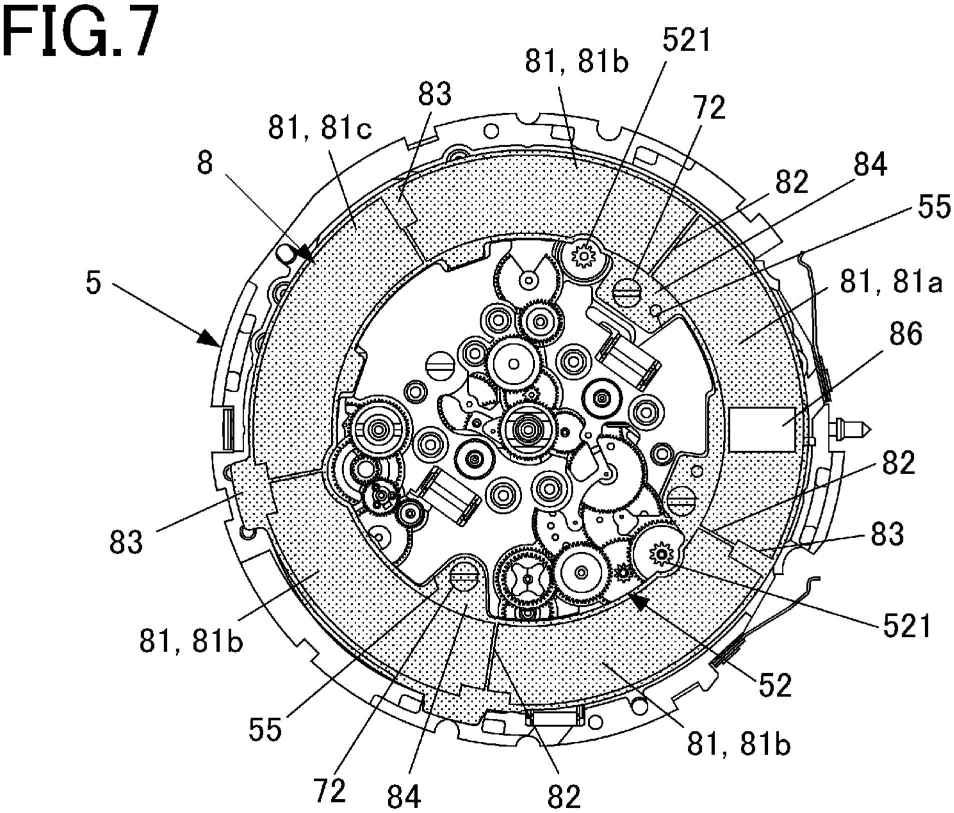
FIG. 7 is a plan view of a module and the solar panel in the embodiment viewed from the visible side.
Figure 8:
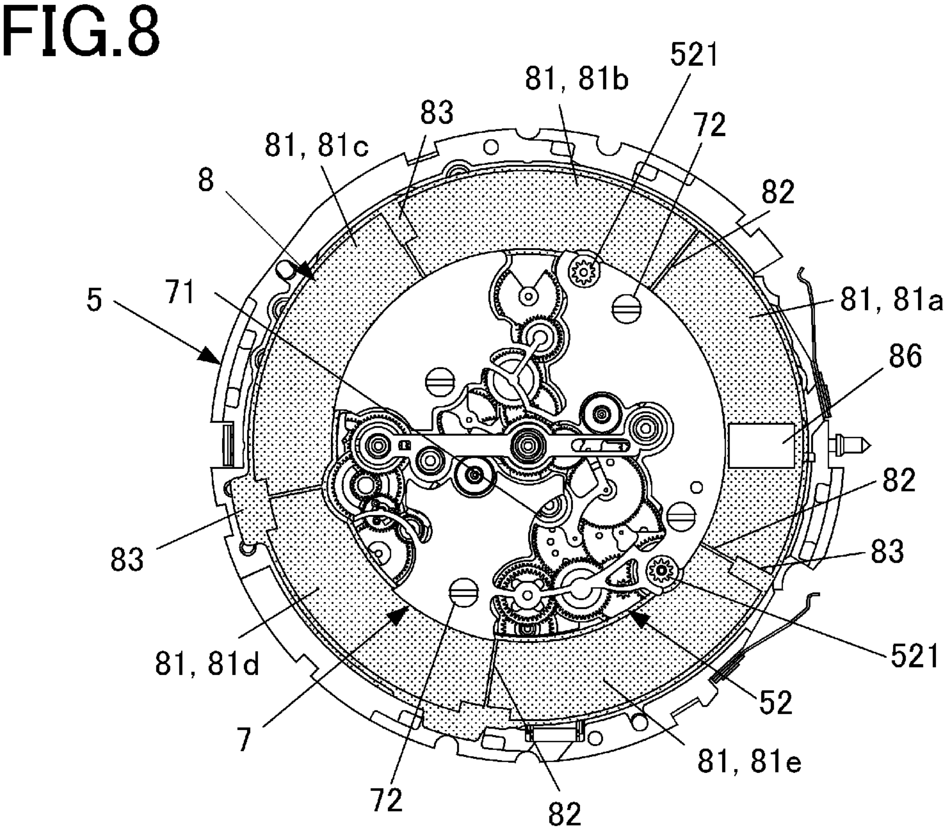
FIG. 8 is a plan view of a date indicator holder disposed on the module and the solar panel shown in FIG. 7.

Specifically, as shown in FIG. 3 and FIG. 7, recess parts 55 are formed in the module 5 (e.g., in the visible-side surface of the main plate 51) at positions corresponding to the contact parts 84. The shape of the recess parts 55 corresponds to the shape of the contact parts 84 so that the contact parts 84 fit in the respective recess parts 55 in the assembled state. With such a configuration, the solar panel 8 is prevented from rotating in the circumferential direction, and the position of the solar panel 8 with respect to the circumferential direction is determined.

To more certainly prevent rotation of the solar panel 8 and to fix the solar panel 8 against the pushing of the contact springs 87, it is preferable that the solar panel 8 be screwed near the contact springs 87.

In this embodiment, all of the three contact parts 84 including the contact part 84 that abuts the contact springs 87 have screw holes 85. Through the screw holes 85, screws 72 (see FIG. 3 and FIG. 7) are inserted from above the date indicator holder 7 to screw the date indicator 6 and the solar panel 8 on the module 5. In FIG. 3, the dashed lines show the points in which the screws 72 are inserted.

On the date indicator 6, the date indicator holder 7 is disposed.

The date indicator holder 7 has a cut-out part 71 (see FIG. 3 and FIG. 8) at a part corresponding to the components mounted on the module 5 and desired to be visible from outside, such as gear wheels of the wheel mechanism 52. The shape of the cut-out part 71 is not limited to the illustrated example. The positions and areas of the cut-out parts are determined according to the positions of components to be exposed outside.

As described above, the date indicator holder 7 is screwed on the module 5 with screws 72 along with the date indicator 6 and the solar panel 8.

Figure 9B:
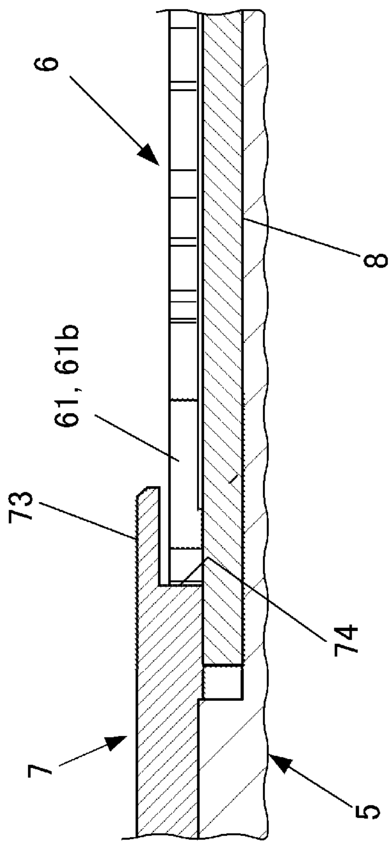
FIG. 9B is a cross section in which part of FIG. 9A is enlarged.

FIG. 9A is the perspective cross section of the date indicator holder 7, the date indicator 6, and the solar panel 8 that are laid on one another. FIG. 9B is the enlarged cross section showing part of the date indicator holder 7, the date indicator 6, and the solar panel 8 laid on one another.

As shown in FIG. 9A and FIG. 9B, on the circumferential surface of the date indicator holder 7, a step part 73 is formed. The height of the step part 73 is almost equal to the height of the frame 61 (in this embodiment, the second frame part 61*b*). The outer edge of the frame 61 is positioned under the step part 73, so that the position of the date indicator 6, including the frame 61, in the up-down direction is determined. Thus, the date indicator 6 is restrained from rising up.

The step part 73 has a stand part 74. The stand part 74 extends along the inner circumferential surface of the frame 61, and serves as a wall part that restrains the date indicator 6 including the frame 61 from moving in the surface direction (the radial direction). Thus, the stand part 74 serves as a position determiner that determines the position of the date indicator 6 in the radial direction. Thus, at the inside in the radial direction of the date indicator 6, the date indicator 6 is held down from above, so that the gear end of the date indicator 6 is prevented from being pushed upward by the contact springs 87. Accordingly, the gear 62 of the date indicator 6 can accurately engage with the gear wheel of the wheel mechanism 52.

When the date indicator 6 is under the step part 73 of the date indicator holder 7, the invisible-side surfaces of the date indicator holder 7 and the date indicator 6 are almost flush, as shown in FIG. 9B. The invisible-side flush surfaces are positioned on the visible-side of the solar panel 8. The solar panel 8 is therefore prevented from moving upward.

The date indicator holder 7 also holds the components on the module 5 and restrains the components from shifting. Thus, the positions of the components mounted on the module 5, such as an hour wheel, are also determined.

Next, the effect of this embodiment is described.

In this embodiment, the wheel mechanism 52 and so forth are mounted on the front and back surfaces of the main plate 51 of the module 5. Over the module 5 (at the visible side of the timepiece), the ring-shaped solar panel 8 is disposed.

The contact springs 87 are disposed between the contact part 84 of the solar panel 8 and the module 5. The solar panel 8 is electrically connected to the board 57 via the contact springs 87.

The contact parts 84 of the solar panel 8 are fit into the recess parts 55 formed in the main plate 51, so that the solar panel 8 is restrained from rotating in the circumferential direction. The position of the solar panel 8 is thus determined.

The date indicator 6 is laid over the solar panel 8, and the date indicator holder 7 is placed on the date indicator 6 to hold the date indicator 6 from above. The date indicator holder 7, the date indicator 6, and the solar panel 8 are altogether screwed on the module 5 with screws 72.

The date indicator holder 7, the date indicator 6, the solar panel 8, and the module 5 combined together are then housed in the timepiece case 1 along with the other components of the timepiece (e.g., hands), and the back lid is attached to the timepiece case 1. Thus, the timepiece is completed.

According to the above configuration, the central part of the timepiece 100 is not covered by the solar panel 8 or other components. The mechanical structure of the timepiece, such as the wheel mechanism 52, are therefore exposed.

Part of the date indicator 6 except the letter parts and so forth is through holes. The date indicator 6 therefore blocks less light when placed on the solar panel 8, and the solar panel 8 can generate a sufficient amount of electric power without a solar panel that covers the entire front surface of the timepiece.

The date indicator 6 is three-dimensionally formed by making through holes in metal material (by lightening metal material) and has a stronger presence as compared with a two-dimensional date indictor on which dates are printed. Such a date indicator 6 allows the base color, the uneven surface, the division lines 82, and the cell connectors 83 of the solar panel 8 to be inconspicuous. The date indicator 6 thus contributes to an excellent appearance of the timepiece.

As described above, according to the present disclosure, the timepiece 100 includes the date indicator 6 and the ring-shaped solar panel 8 as a solar battery that is positioned at the invisible side of the date indicator 6. The date indicator 6 includes the frame 61 that has the gear 62 that engages with the gear wheel driven to rotate and the letter parts 64 supported by the frame 61 via the bridge(s) 63.

As the solar panel 8 is ring-shaped, the central part of the timepiece 100 is not covered by the solar panel 8 or other components. The mechanical structure of the timepiece, such as the wheel mechanism 52, can therefore be exposed.

The date indicator 6, which includes the frame(s) 61, the bridges 63, and the letter parts 64, is three-dimensionally formed. When such a date indicator 6 is placed over the solar panel 8, the base color, the uneven surface, the division lines 82, and the cell connectors 83 of the solar panel 8 become inconspicuous.

The date indicator 6 thus contributes to the substantial, solid, and excellent appearance of the timepiece.

Since the date indicator 6 consists of minimum parts, such as the frame(s) 61, the bridges 63, and the letter parts 64, the date indicator 6 blocks less light when placed over the solar panel 8. Accordingly, the solar panel 8 can generate a sufficient amount of electric power without a solar panel that covers the entire front surface of the timepiece.

In this embodiment, the gear wheel that engages with the gear 62 of the frame 61 is the gear wheel 521 that constitutes the wheel mechanism 52 (see FIG. 1, etc.).

According to such a configuration, the date indicator 6 rotates as the gear wheel 521 constituting the wheel mechanism 52 rotates.

In this embodiment, the solar panel 8 is divided into multiple cells 81 by the division lines 82. When the date indicator 6 is stationary, the division lines 82 overlap with the bridges 63 of the date indicator 6.

The date indicator 6 does not rotate except when the date is updated. The date indictor 6 is normally in a stationary state when the user uses the timepiece 100.

In the stationary state, the bridges 63 of the date indicator 6 overlap with the division lines 82, thereby hiding the division lines 82 and making the division lines 82 inconspicuous. This allows the timepiece to have an excellent external appearance.

In this embodiment, the shape of the division lines 82 corresponds to the shape of the bridges 63.

Such division lines 82 are more certainly inconspicuous when hidden by the bridges 63 of the date indicator 6.

In this embodiment, the solar panel 8 has the contact parts 84 at the inside or outside of its ring-shaped main body, the contact parts 84 being electrically connected to the board 57.

With the contact parts 84, the solar panel 8 can be in contact with the board 57 without reducing the effective electricity generation region of the ring-shaped main body.

In this embodiment, the contact parts 84 also function as a rotation preventer that prevents the solar panel 8 from rotating in the circumferential direction.

In this embodiment, the projection parts that project outward or inward from the ring-shaped main body are used as the contact parts 84, and the contact parts 84 are fitted into the recess parts 55 of the module 5. The contact parts 84 thus easily restrain the solar panel 8 from rotating in the circumferential direction and determine the position of the solar panel 8.

In this embodiment, the solar panel 8 further includes the date background region 86 at a part corresponding to the date indication position where the date indicator 6 indicates a date. The date background region 86 is colored so as to be clearly distinguishable from the date indicator 6.

With the date background region 86, the timepiece clearly indicates the currently selected date for the user.

In this embodiment, the frame 61 of the date indicator 6 includes the first frame part 61*a* and the second frame part 61*b* that is inside the first frame part 61*a*. The letter parts 64 are supported between the first frame part 61*a* and the second frame part 61*b* via the bridge(s) 63.

Such a date indicator 6 can retain a high level of shock resistance.

In this embodiment, part of the date indicator 6 except the frame 61, the bridges 63, and the letter parts 64 are through holes.

Such a date indicator 6 blocks less light when placed over the solar panel 8, so that the solar panel 8 can generate a sufficient amount of electric power without a solar panel that covers the entire front surface of the timepiece.

With the through holes, the date indicator 6 is made three-dimensional. Such a date indicator 6 looks substantial, solid and excellent as compared with a date indicator formed by printing letter parts on a plate member, for example.

Although the embodiment of the present invention has been described, the embodiment is not intended to limit the present invention and can be variously modified without departing from the scope of the invention.

For example, in the above embodiment, the solar panel 8 includes the cell connectors 83 that connect the cells 81 and that are formed on the outer edge parts of the solar panel 8 along the division lines 82. However, the position and shape of the cell connectors 83 are not limited to the above embodiment.

Figure 10:
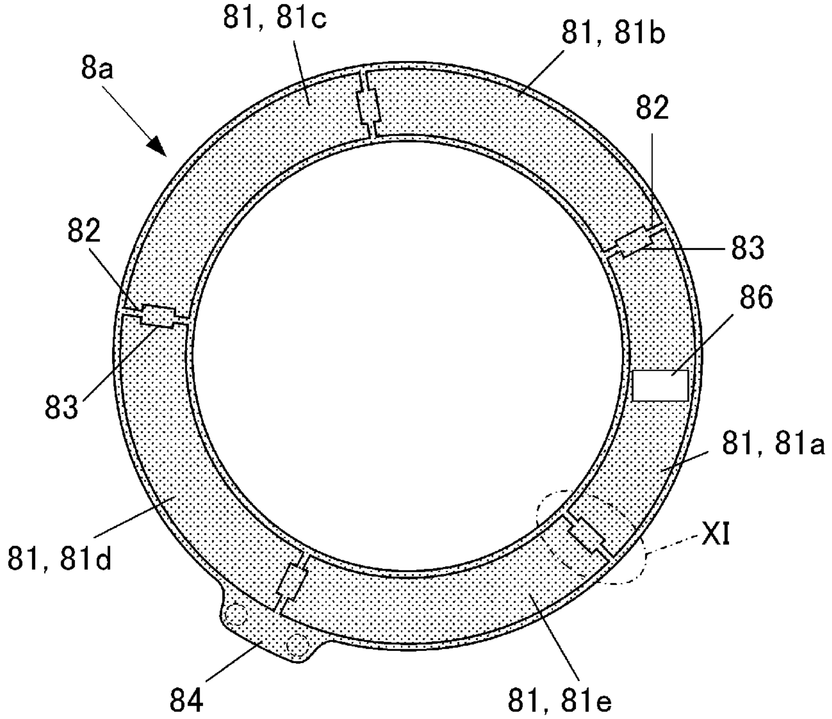
FIG. 10 is a plan view of a modification of the solar panel.
Figure 11:
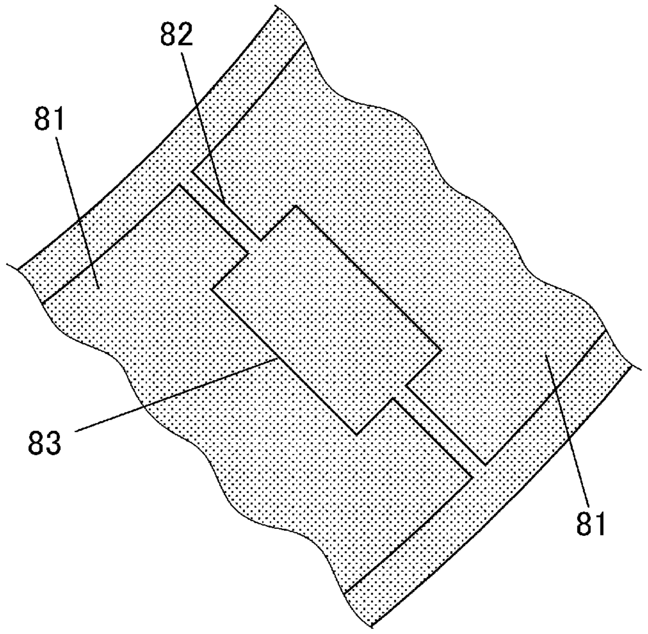
FIG. 11 is a plan view in which the section XI in FIG. 10 is enlarged.

For example, as shown in FIG. 10 and FIG. 11, the cell connectors 83 of the solar panel 8*a* may be formed in the middle of the respective division lines 82.

Figure 12:
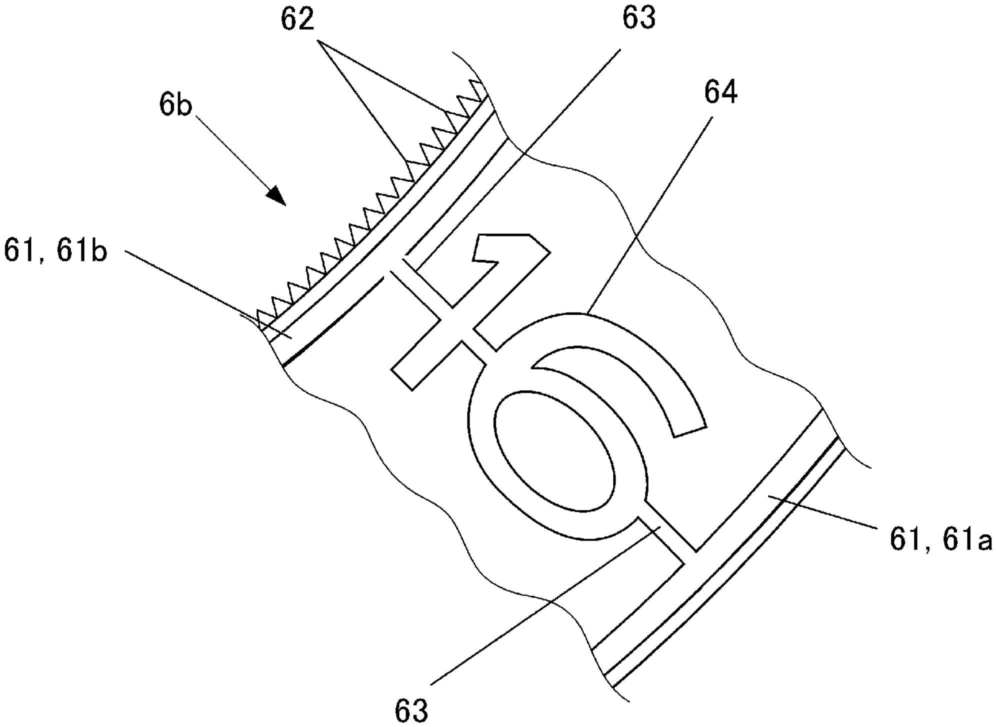
FIG. 12 is a plan view in which part of a modification of the date indicator is enlarged.

In such a case, as shown in FIG. 12 as an example, each of the letter parts 64 is disposed in the middle of the bridge 63 formed across the first frame part 61*a* and the second frame part 61*b*.

Figure 13:
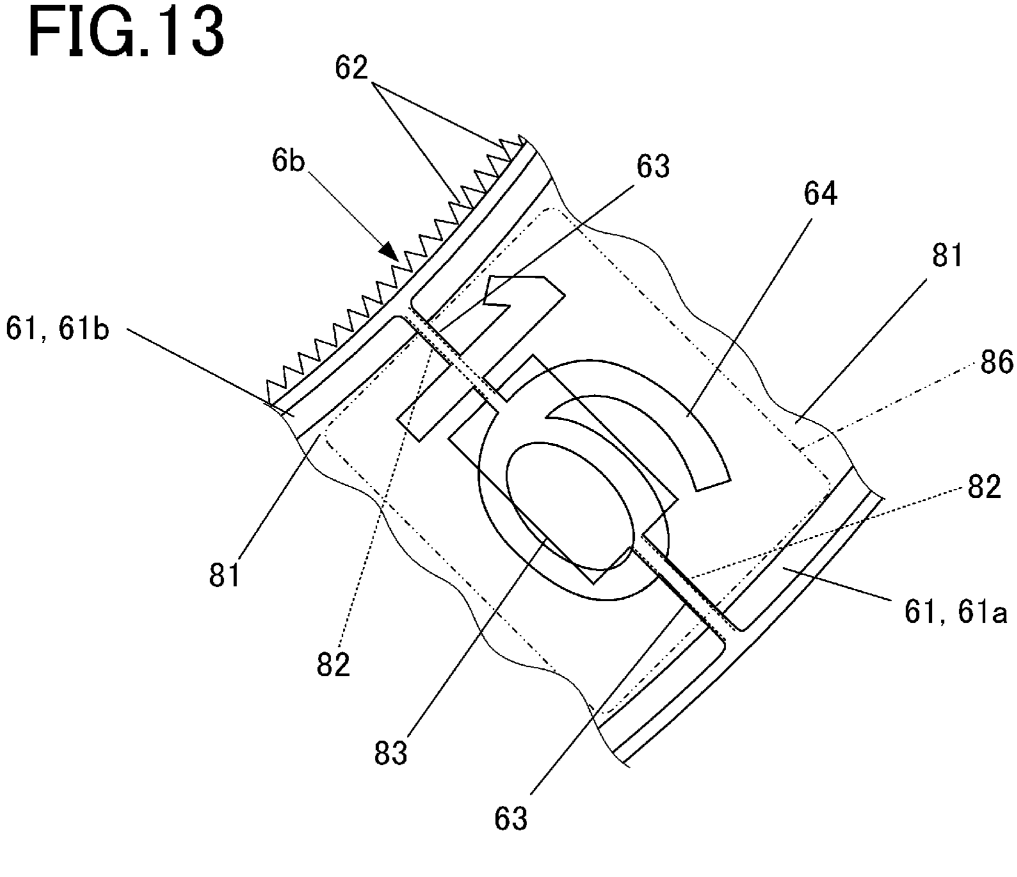
FIG. 13 is a plan view of the date indicator in FIG. 12 laid over the solar panel in FIG. 10.

According to such a configuration, the letter parts 64 of the date indicator 6 overlap with the cell connectors 83 when the date indictor 6*b* is stationary, as shown in FIG. 13. The cell connectors 83 are thus hidden by the letter parts 64 and become inconspicuous.

Further, when the date indicator 6*b* is stationary, the bridges 63 that support the letter parts 64 overlap with the division lines 82 of the solar panel 8. The division lines 82 are also inconspicuous, and the timepiece 1 can retain a beautiful external appearance.

As shown in FIG. 13, the division line 82 and the cell connector 83 may be formed so as to be within the date background region 86, and the division line 82, the cell connector 83, and the date background region 86 may be altogether colored with the color of the date background region 86 (e.g., white). Accordingly, the division line 82 and the cell connector 83 are inconspicuous even when the positions of the bridge 63 and the letter part 64 of the date indicator 6*b* slightly deviate from the position of the division line 82 and the cell connector 83.

Figure 14:
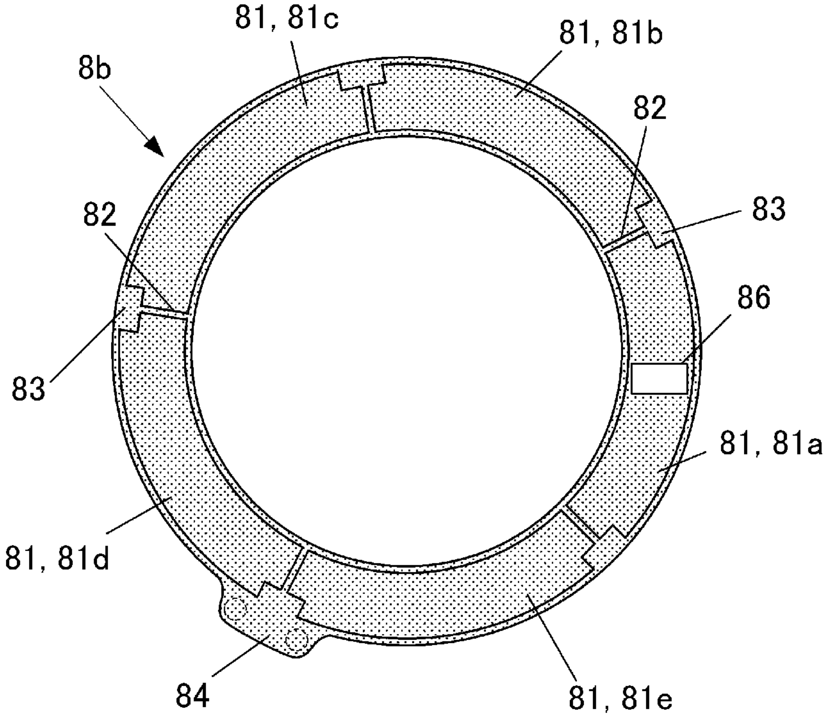
FIG. 14 is a plan view of a modification of the solar panel.

Further, as shown in FIG. 14, the cell connectors 83 of the solar panel 8*b* may be formed along the outer circumference of the solar panel 8, and the width of each cell connector 83 in the radial direction may be narrowed.

Figure 15:
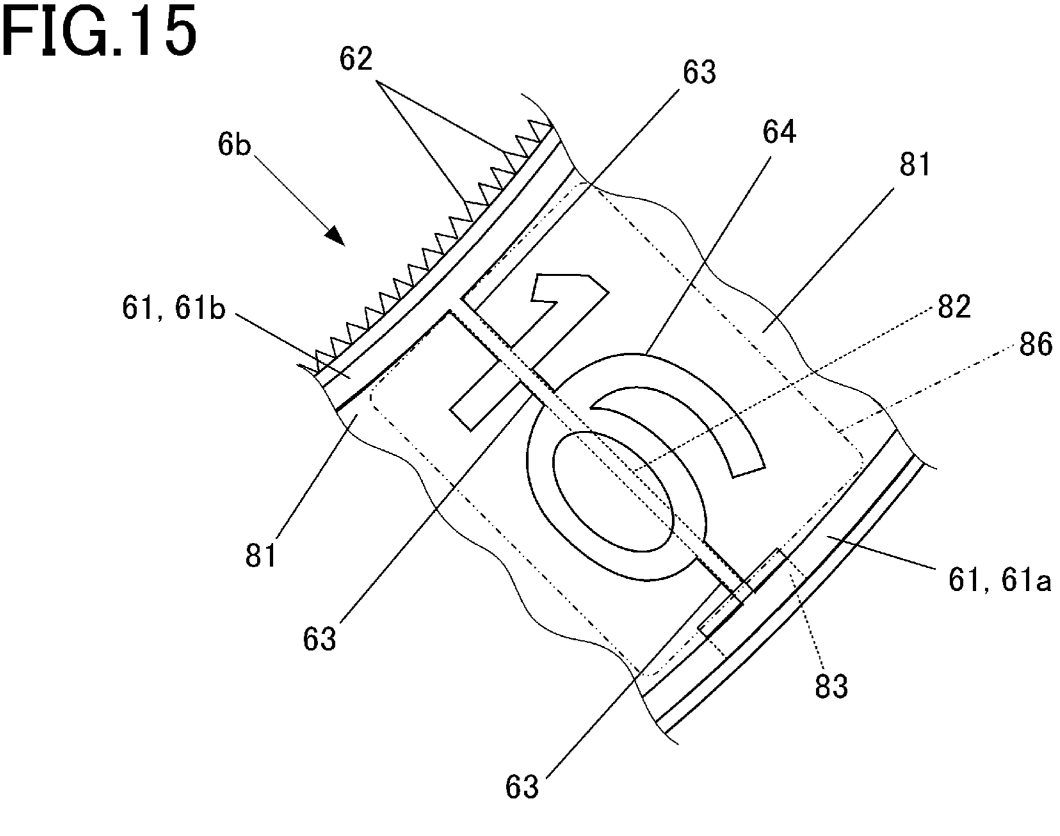
FIG. 15 is a plan view of the date indicator in FIG. 12 laid over the solar panel in FIG. 14.

In such a case, most part of the cell connectors 83 is covered and hidden by the first frame part 61*a*, which is formed outside the date indicator 6*c*, as shown in FIG. 15 as an example. The cell connectors 83 thus become inconspicuous.

Further, the parting member 3 may be formed to extend over the cell connectors 83, so that the cell connectors 83 are hidden more certainly.

Further, as shown in FIG. 15, the division line 82 and the cell connector 83 may be formed within the date background region 86, and the division line 82, the cell connector 83, and the date background region 86 may be altogether colored with the color of the date background region 86 (e.g., white), so that division line 82 and the cell connector 83 are inconspicuous.

Figure 16:
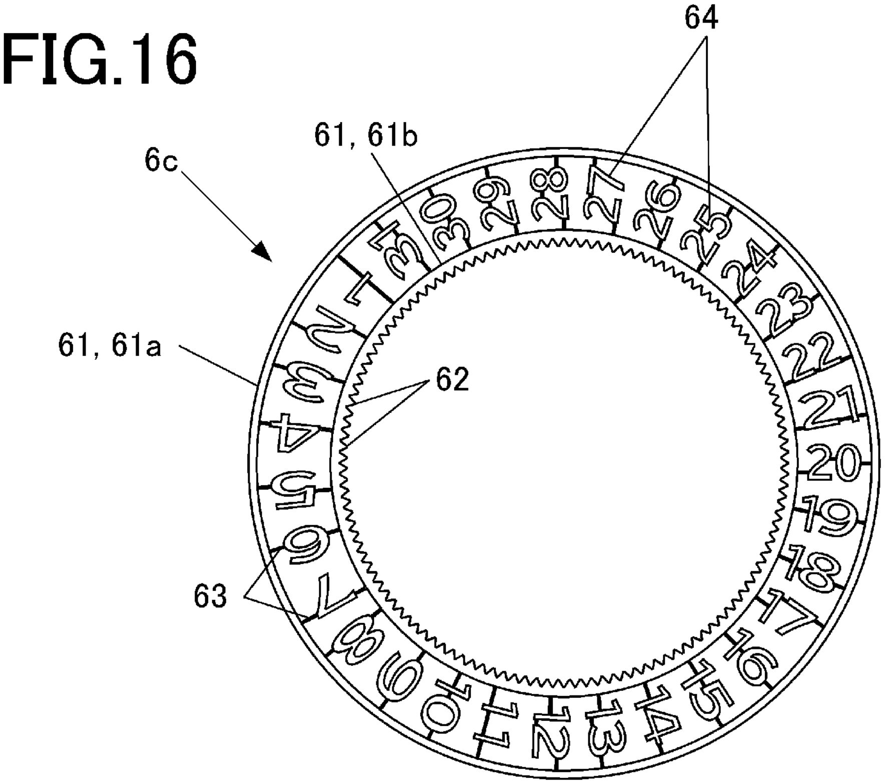
FIG. 16 is a plan view of a modification of the date indicator.

The arrangement of the letter parts 64 of the date indicator 6 is not limited to the above embodiment. For example, as in the date indicator 6*c* shown in FIG. 16, the letter parts 64 indicating the dates from “1” to “31” may be arranged counterclockwise.

Figure 17:
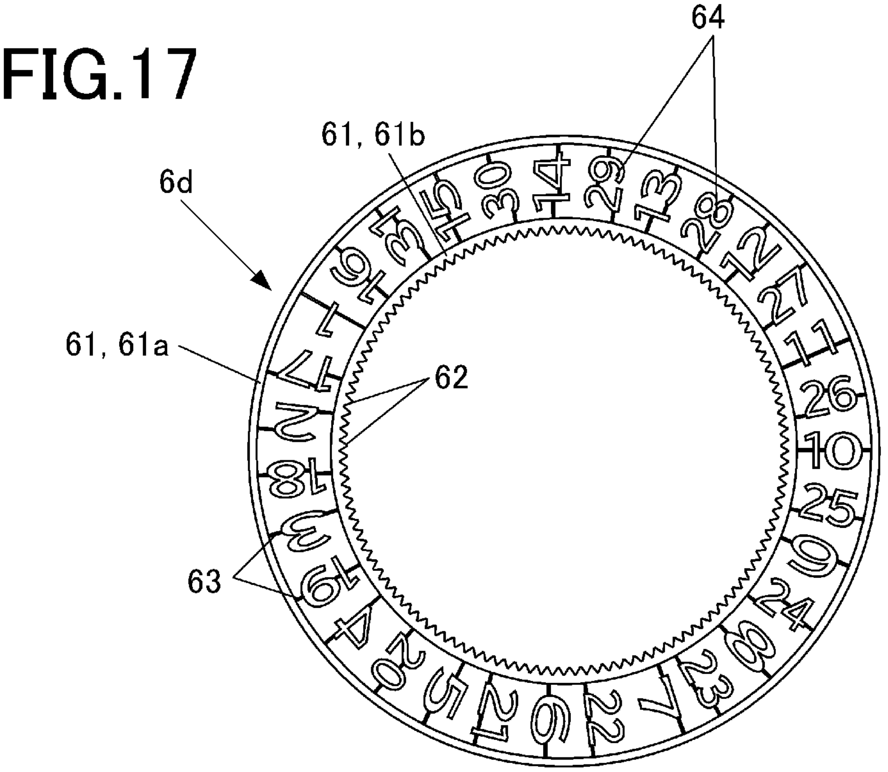
FIG. 17 is a plan view of a modification of the date indicator.

For another example, like the date indicator 6*d* shown in FIG. 17, the letter parts 64 indicating the dates from “1” to “31” may be arranged on every other date.

Although not illustrated, one-digit dates (i.e., 1 to 9) may be appropriately mixed with the two-digit dates (i.e., 11 to 31). In the case, the letter parts 64 may be arranged such that the letter parts 64 having a smaller area (e.g., 1, 7) are next to the letter parts 64 having a larger area (e.g., 28, 29).

Some letter parts 64 have a larger area, while other letter parts 64 have a smaller area. Therefore, the area of each cell 81 that effectively receives light (effective light-receiving area) varies depending on the letter parts 64 that overlap with the cell 81. When the letter parts 64 are arranged such that “1” and “31” are next to each other as in the above embodiment or the example of FIG. 16, the effective light-receiving area greatly differs among the cells 81. To deal with this, the letter parts 64 may be arranged such that letter parts corresponding to a large effective light receiving area and letter parts corresponding to a small effective light receiving area are mixed. For example, the letter parts 64 indicating 1 to 31 may be arranged on every other day, so that variations of effective light receiving areas become small among the cells 81.

This allows the effective electricity generation regions uniform among the cells 81. Accordingly, the generation efficiency increases.

To restrain variations of effective light receiving areas, the design of the letter parts 64 may be adjusted, instead of or as well as adjusting the order of dates. For example, letters corresponding to a large effective light receiving area may be formed with thicker metal lines, whereas letters corresponding to a small effective light receiving area may be formed with thinner metal lines.

For another example, the level of lighting the metal material may be adjusted. For example, letters corresponding to a large effective light receiving area may be made of thick metal material, whereas letters corresponding to a small effective light receiving area may be made of thin metal material.

The shapes of the solar panel 8 and the cells 81 constituting the solar panel 8 are not limited to the substantial ring-shape in the above embodiment.

When the timepiece 100 has a rectangular shape, the solar panel 8 may also have a rectangular frame shape, for example.

In the above embodiment, the solar panel 8 includes five cells 81*a* to 81*e* as an example. However, the number of cells 81 constituting the solar panel 8 is not limited to a specific number. The number of cells may be more than or less than five (e.g., six, three) in the above embodiment.

The way of dividing the solar panel 8 is also not specifically limited. In the above embodiment, the ring-shaped solar panel 8 is divided into cells 81 by the radial division lines 82 that extend in the radial direction of the solar panel 8, as an example. However, the division lines that divide the solar panel 8 into multiple cells 81 are not limited to such lines.

For example, the solar panel 8 may be divided into multiple ring-shaped cells by concentric division lines.

In a case where the user wears the timepiece 100 as shown in FIG. 1, part of the timepiece 100 may be covered by the sleeve of the cloth of the user, for example. If the solar panel 8 is divided into cells 81 by the radial division lines 82 that extend in the radial direction, some of the cells 81 may completely hidden behind the sleeve.

On the other hand, if the solar panel 8 is divided into ring-shaped cells by the concentric division lines, the cells are not completely hidden by the sleeve or the like, and the timepiece 1 can avoid the state where the solar panel generates no electric power (i.e., the state where the timepiece 1 completely loses the electricity generation function).

In the above embodiment, the date background region 86 is formed on the solar panel 8 as an example. However, the date background region 86 may not be necessarily formed on the solar panel 8.

As long as the data indication position of the date indicator 6 (the position where the current date is indicated) is clearly noticeable for the user, any configuration is applicable. For example, the windshield member 2 or the parting member 3 may have a frame that defines the date indication position.

In the above embodiment, a dial plate is not provided. However, a ring-shaped dial plate may be provided between the solar panel 8 and the date indicator 6, for example.

In such a case, the dial plate is made to have a high light transmittance in order to minimize the decrease in generation efficiency of the solar panel 8. For example, the dial plate may be made of transparent material, such as glass, on which printing is performed. When a dial plate is provided, the division lines 82 and the cell connectors 83 of the solar panel 8 are more certainly inconspicuous. The dial plate can also prevent direct contact between the date indicator 6 and the solar panel 8, so that the date indicator 6 rotates smoothly.

When a dial plate is provided, the dial plate may have a frame that defines the date indication position.

In the above embodiment, the solar panel 8 (solar battery) is ring-shaped as an example. However, the shape of the solar battery is not limited to the ring shape but may be another shape.

In the above embodiment, the frame 61 of the date indicator 6 is ring-shaped. However, the shape of the frame 61 and the date indicator 6 including the frames 61 is not limited to the ring shape but may be another shape. The frame 61 may not extend along the whole circumference of the electronic device (e.g., timepiece 100) in a plan view. The frame 61 may extend only part of the whole circumference of the electronic device.

Although the timepiece 100 is disclosed as an example of the electronic device, the electronic device is not limited to a timepiece.

The electronic device may be any device including: the date indicator 6 that includes letter parts and non-letter parts different from the letter parts, the non-letter parts being through holes; and the solar battery (solar panel 8) that is disposed below the date indicator 6. For example, the electronic device may be a calendar device that does not indicate time but indicates the date, the day of the week and so forth, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-152858, filed on Sep. 21, 2021 which is hereby incorporated by reference in in its entirety.

What is claimed is:

1. An electronic device comprising:

a date indicator that includes a character part and a non-character part different from the character part, the non-character part being a through hole; and a solar battery disposed below the date indicator, wherein:

the date indicator includes a frame and a bridge, the frame comprising a first frame part and a second frame part disposed inside the first frame part, wherein the frame supports the character part via the bridge, the solar battery has a shape along the frame, an outer part of the solar battery along the first frame part and an inner part of the solar battery along the second frame part are non-light-receiving regions, the first frame part overlaps the outer part of the solar battery, the second frame part overlaps the inner part of the solar battery, the solar battery is divided into multiple cells by a division line, and the division line overlaps with the bridge of the date indicator when the date indicator is stationary.

2. The electronic device according to claim 1, wherein the frame is ring-shaped.

3. The electronic device according to claim 1, further comprising:

a gear wheel configured to be driven to rotate, wherein:

the frame includes a gear that engages with the gear wheel; and the frame is configured to be rotated by the gear wheel through the gear.

4. The electronic device according to claim 3, wherein the gear wheel constitutes a wheel mechanism.

5. The electronic device according to claim 1, wherein a shape of the division line corresponds to a shape of the bridge.

6. The electronic device according to claim 1, wherein:
the character part is supported between the first frame part and the second frame part via the bridge.

7. The electronic device according to claim 1, wherein a part of the date indicator except the frame, the bridge, and the character part form the through hole.

8. The electronic device according to claim 1, wherein:
the solar battery includes a ring-shaped main body and a contact part provided inside or outside the ring-shaped main body, the contact part being electrically connected to a board.

9. The electronic device according to claim 8, wherein the contact part prevents the solar battery from rotating in a circumferential direction.

10. The electronic device according to claim 1, wherein:
the solar battery includes a cell connector that connects the multiple cells, and
the cell connector overlaps with the character part of the date indicator when the date indicator is stationary.

11. The electronic device according to claim 1, wherein the solar battery includes a date background region at a part corresponding to a date indication position where the date indicator indicates a date, the date background region being colored to be distinguishable from the date indicator.

12. The electronic device according to claim 1, wherein:
the date indicator comprises:
the character part;
the non-character part;
a circular frame; and
a bridge part connected to the circular frame,
wherein the character part is connected to the circular frame by only the bridge part,
wherein the circular frame, the bridge part and the character part form a single layer, and
wherein the single layer defines the through hole and the through hole borders the circular frame, the bridge part and at least a portion of the character part.

13. The electronic device according to claim 1, wherein:
the through hole is made to cause the character part to visually express a day in a month, and
a shape of the through hole is defined by a shape of the character part.

14. The electronic device according to claim 1, wherein the solar battery is to be at least partially exposed to light through the through hole.

15. A timepiece comprising:
a date indicator that includes a character part and a non-character part different from the character part, the non-character part being a through hole;
a solar battery disposed below the date indicator; and
a time indicator,
wherein:
the date indicator includes a frame and a bridge, the frame comprising a first frame part and a second frame part disposed inside the first frame part, the frame supporting the character part via the bridge,
the solar battery has a shape along the frame,
an outer part of the solar battery along the first frame part and an inner part of the solar battery along the second frame part are non-light-receiving regions,
the first frame part overlaps the outer part of the solar battery,
the second frame part overlaps the inner part of the solar battery,
the solar battery is divided into multiple cells by a division line, and
the division line overlaps with the bridge of the date indicator when the date indicator is stationary.

16. The timepiece according to claim 15, wherein:
the solar battery includes a cell connector that connects the multiple cells, and
the cell connector overlaps with an hour sign of the time indicator when the date indicator is stationary.

* * * * *